(12) United States Patent
Huzar

(10) Patent No.: US 8,544,922 B1
(45) Date of Patent: Oct. 1, 2013

(54) MULTI-USE TARP

(76) Inventor: Shawn Huzar, Emmaus, PA (US)

( * ) Notice: Subject to any disclaimer, the term of this patent is extended or adjusted under 35 U.S.C. 154(b) by 1 day.

(21) Appl. No.: 13/351,647

(22) Filed: Jan. 17, 2012

Related U.S. Application Data

(60) Provisional application No. 61/436,581, filed on Jan. 26, 2011.

(51) Int. Cl.
*B65D 30/00* (2006.01)
(52) U.S. Cl.
USPC ............................. 294/214; 294/157; 383/4
(58) Field of Classification Search
USPC ................. 294/152, 156, 157, 214; 383/4; D3/20; D34/1
See application file for complete search history.

(56) References Cited

U.S. PATENT DOCUMENTS

| | | | | |
|---|---|---|---|---|
| 1,871,101 | A * | 8/1932 | Waltz | 135/119 |
| 2,749,957 | A * | 6/1956 | Smith | 294/150 |
| 3,948,528 | A * | 4/1976 | Goodman et al. | 273/286 |
| 4,580,372 | A | 4/1986 | Osborn | |
| 4,620,396 | A * | 11/1986 | Bjorntwedt | 52/3 |
| 5,417,462 | A * | 5/1995 | Hensley | 294/212 |
| 5,911,463 | A * | 6/1999 | Fesko | 294/152 |
| 6,128,852 | A | 10/2000 | Hansen | |
| 6,758,596 | B2 * | 7/2004 | McDonough | 383/4 |
| 7,207,426 | B2 * | 4/2007 | Godshaw et al. | 190/1 |
| D562,647 | S | 2/2008 | Baars | |
| 2003/0190096 | A1 * | 10/2003 | Miodragovic et al. | 383/4 |
| 2007/0290464 | A1 | 12/2007 | Mastromatto et al. | |
| 2009/0314321 | A1 | 12/2009 | Van Dyken | |

\* cited by examiner

*Primary Examiner* — Stephen Vu
(74) *Attorney, Agent, or Firm* — Wendy W. Koba

(57) ABSTRACT

A tarpaulin is configured to include handles, cinch ropes and fasteners to facilitate its use in hauling landscaping plants and materials. The tarp itself is formed of any suitable material as in conventional use today, with the sheet further configured to include a pair of cinch ropes included along a first pair of opposing edges, and a plurality of fasteners disposed along the remaining, opposing pair of edges. A set of four handles are formed at the four corners. The cinch ropes allow for the first pair of edges to be gathered, while the fasteners mate the remaining pair of edges to form an enclosure.

6 Claims, 7 Drawing Sheets

MULTI-USE TARP

CROSS-REFERENCE TO RELATED APPLICATION

This application claims the benefit of U.S. Provisional Application Ser. No. 61/436,581, filed Jan. 26, 2011 and herein incorporated by reference.

TECHNICAL FIELD

The present invention relates to a tarpaulin (hereinafter "tarp") configured to include handles, cinch ropes and fasteners to facilitate its use in hauling landscaping plants and materials.

BACKGROUND OF THE INVENTION

Tarpaulins, or tarps, have been in use for many years now, and still have a wide variety of uses today. Originating as tarred canvas sheets used by sailors to cover ships, tarps have evolved into many different shapes, sizes, strengths and qualities. Today's tarps are usually coated in polyethylene, latex, or some other weather-resistant coating.

Landscapers frequently use tarps to collect leaves and yard debris (tree branches, cuttings from bushes and the like) to be hauled away for disposal. In this same line of business, tarps may be used to cover and protect shrubs and trees as they are transported from a nursery to a planting location.

While most today's tarps include a series of grommets along their ends to add in "tying down" a load on a bed of a truck, the tarp itself remains clumsy to maneuver when working on a landscaping site.

SUMMARY OF THE INVENTION

The needs remaining in the prior art are addressed by the present invention, which relates to a tarpaulin (also referred to herein as a "tarp") configured to include handles, cinch ropes and fasteners to facilitate its use in hauling landscaping plants and materials.

In accordance with the present invention, a tarp is formed of any suitable material as in conventional use today, with the tarp sheet further configured to include a pair of cinch ropes included along a first pair of opposing edges, and a plurality of fasteners disposed along the remaining, opposing pair of edges. A set of four handles are formed at the four corners. The cinch ropes allow for the first pair of edges to be gathered, while the fasteners mate the remaining pair of edges to form an enclosure.

In a preferred embodiment, a series of snaps are used as the fasteners along the pair of edges. Other fastening arrangements, such as clips or hook-and-loop fasteners, may be used as well. A tarp formed in accordance with the present invention may also include a series of grommets around its periphery, as common in prior art tarp configurations.

The embodiments and advantages of the present invention will become apparent during the course of the following discussion and by reference to the accompanying drawings.

BRIEF DESCRIPTION OF THE DRAWINGS

Referring now to the drawings, where like numerals represent like parts in several views.

DESCRIPTION OF THE INVENTION

As will be described in detail below, the present invention presents a tarp configuration that overcomes the limitations remaining in the type of conventional tarps used for landscaping work. In particular and as shown below, a tarp of the present invention is formed to include handles, cinch ropes and fasteners to facilitate its use in hauling landscape plants and materials.

Figure 1:
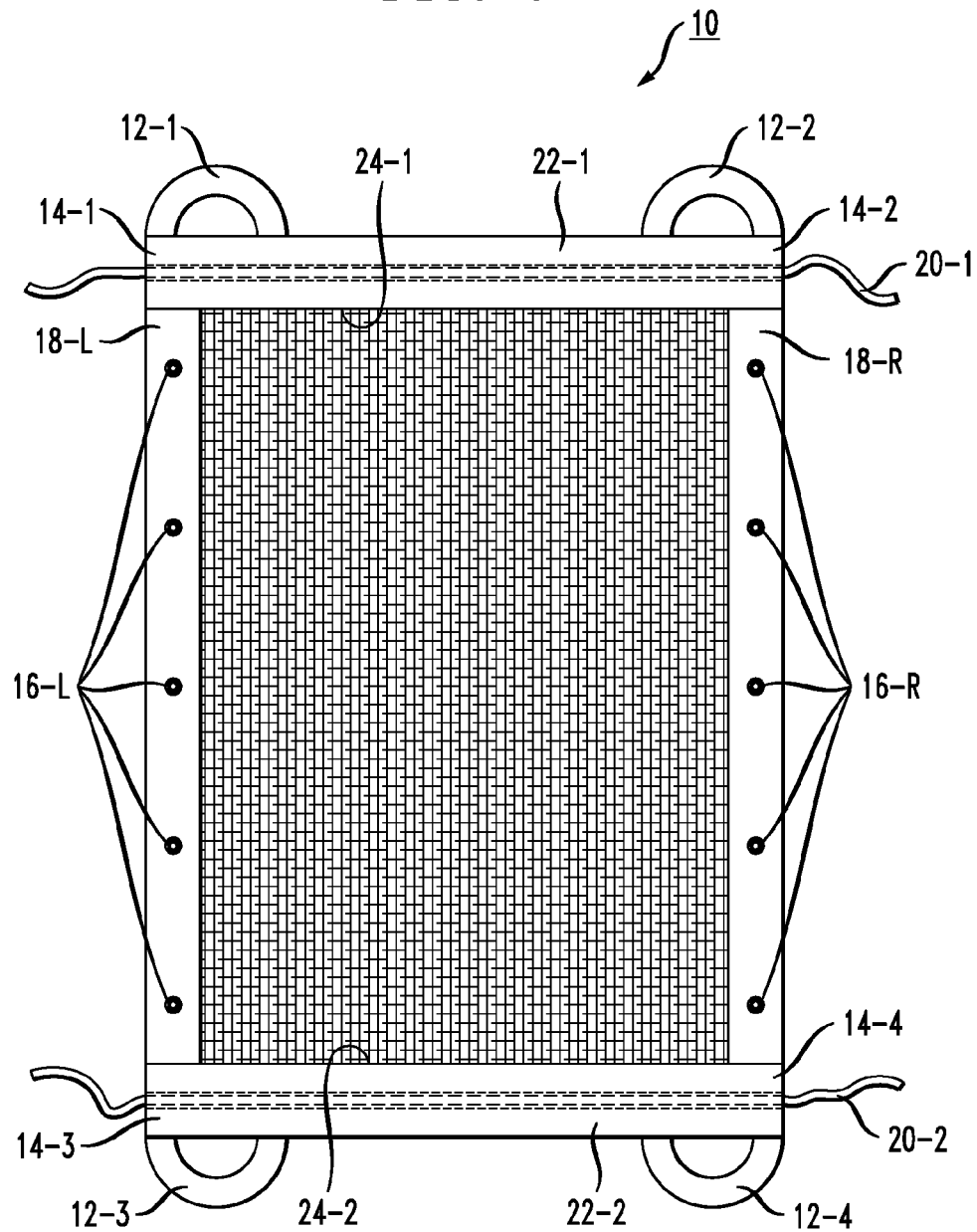
FIG. 1 is a top view of an exemplary tarp formed in accordance with the present invention.

FIG. 1 illustrates an exemplary tarp 10 formed in accordance with the present invention. Tarp 10 comprises a sheet that is generally rectangular in form, with the specific dimensions not germane to the subject matter of the invention. In one embodiment, tarp 10 comprises a PVC-coated mesh sheet, although other materials may be utilized and appropriate gauges of material may be utilized as well. Moreover, while most tarps will be rectangular, other shapes may be used as better-suited for particular jobs.

Figure 2:
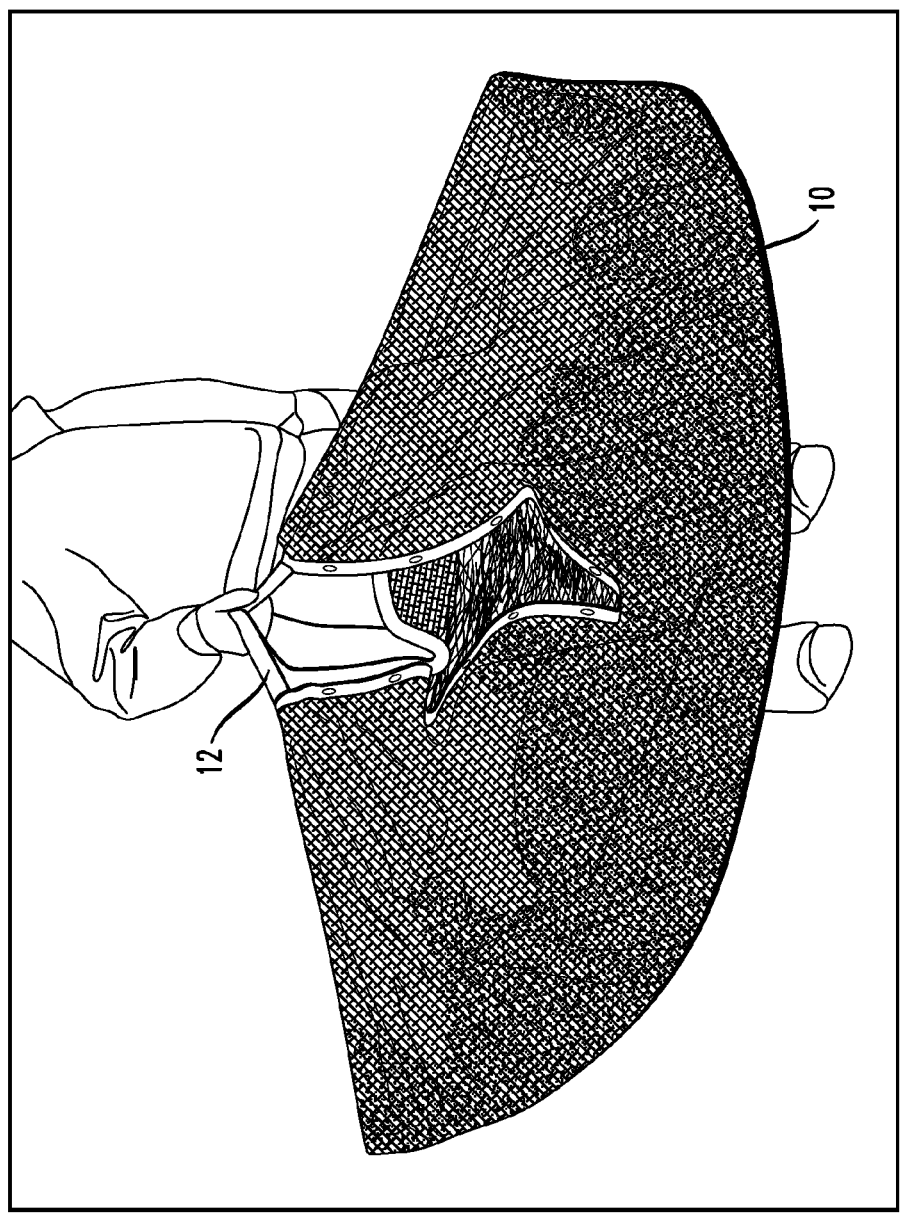
FIG. 2 illustrates the tarp of FIG. 1, when the set of four handles are gathered together in use.
Figure 3:
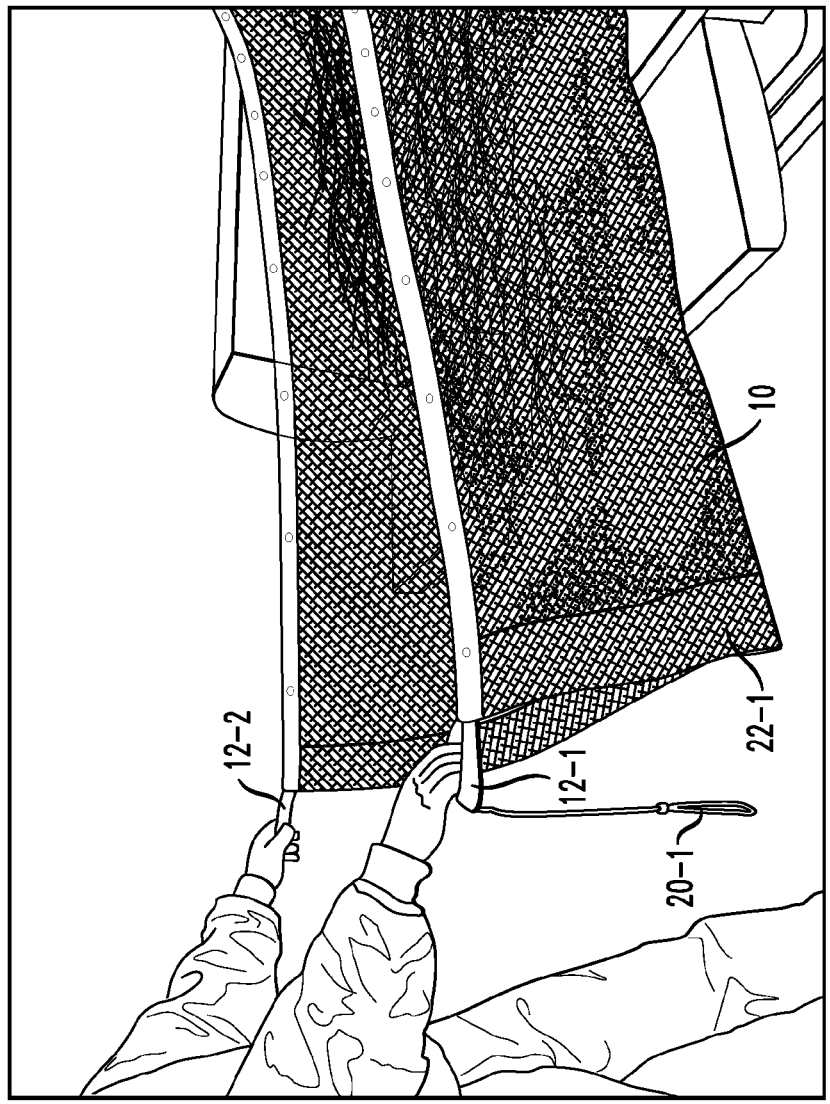
FIG. 3 illustrates the ability to move the tarp of the present invention by using a pair of handles.

In accordance with the present invention, tarp 10 includes a set of four handles 12-1, 12-2, 12-3 and 12-4, attached to a set of tarp corners 14-1, 14-2, 14-3 and 14-4, respectively. The set of four handles 12 can then be collected together and held by an individual so as to carry a load of material placed upon tarp 10. FIG. 2 illustrates tarp 10 with its set of four handles 12 gathered together for this purpose. When tarp 10 is placed in the bed of truck (or any other suitable location), the tarp may be moved by pulling on a pair of handles, where FIG. 3 illustrates this use of tarp 10, with an individual using handles 12-1 and 12-2 to remove tarp 10 from the bed of a truck.

Figure 4:
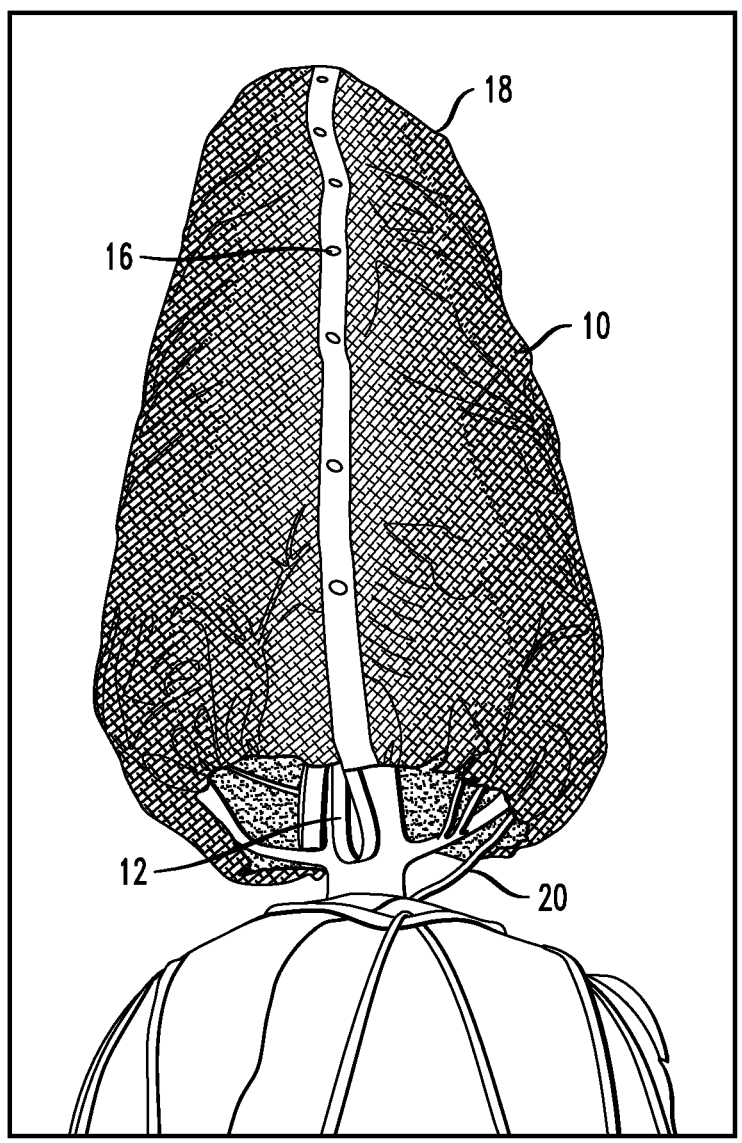
FIG. 4 depicts the tarp of FIG. 1, with a pair of edges fastened together, in this case, using a series of snap fasteners.
Figure 5:
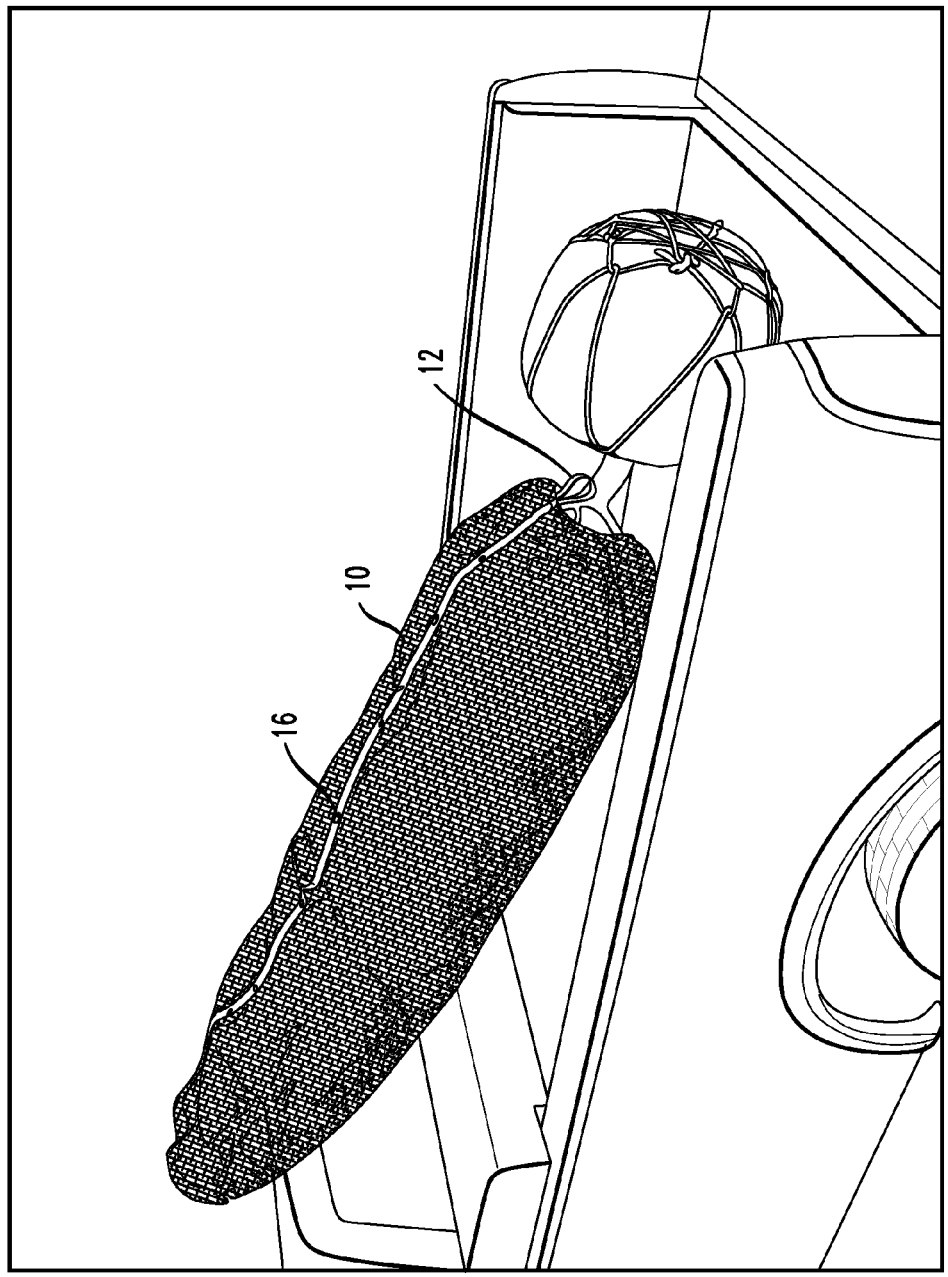
FIG. 5 illustrates the use of the tarp of FIG. 1 to load a heavy item into a truck bed.

Referring back to FIG. 1, tarp 10 is shown as further comprising a plurality of fasteners 16 disposed along a pair of longer, opposing edges 18 of tarp 10. In the embodiment of FIG. 1, a plurality of left-hand fastening components 16-L are shown along left-hand edge 18-L, where these components will mate with a like plurality of right-hand fastening components 16-R formed along right-hand edge 18-R. Longer edges 18-L and 18-R may be fastened together to aid in containing material disposed on tarp 10. Alternatively, longer edges 18-L and 18-R may be fastened together to surround a shrub or tree being transported to a work site. FIG. 4 shows tarp 20 as fastened together to surround a tree. The tarp-covered tree can then be easily loaded into a truck bed, as shown in FIG. 5.

In a preferred embodiment, a plurality of snaps are used as fasteners 16. However, it is to be understood that other types of fastening arrangements may be used, such as clips or hook-and-loop fasteners. An additional benefit of including fasteners 16 on opposing edges 18 is that multiple tarps can be joined together to form a larger "covering"/tarp, when necessary.

Referring back to FIG. 1, tarp 10 of the present invention is shown as further including a pair of cinch ropes 20-1, 20-2, disposed within a pair of casings 22-1 and 22-2 formed along a pair of short edges 24-1 and 24-2 of tarp 10. First cinch rope 20-1 is shown as passing through casing 22-1 formed along top short edge 24-1 of tarp 10. Similarly, second cinch rope 20-2 is shown as passing through casing 22-2 formed along bottom short edge 24-2 of tarp 10.

Figure 6:
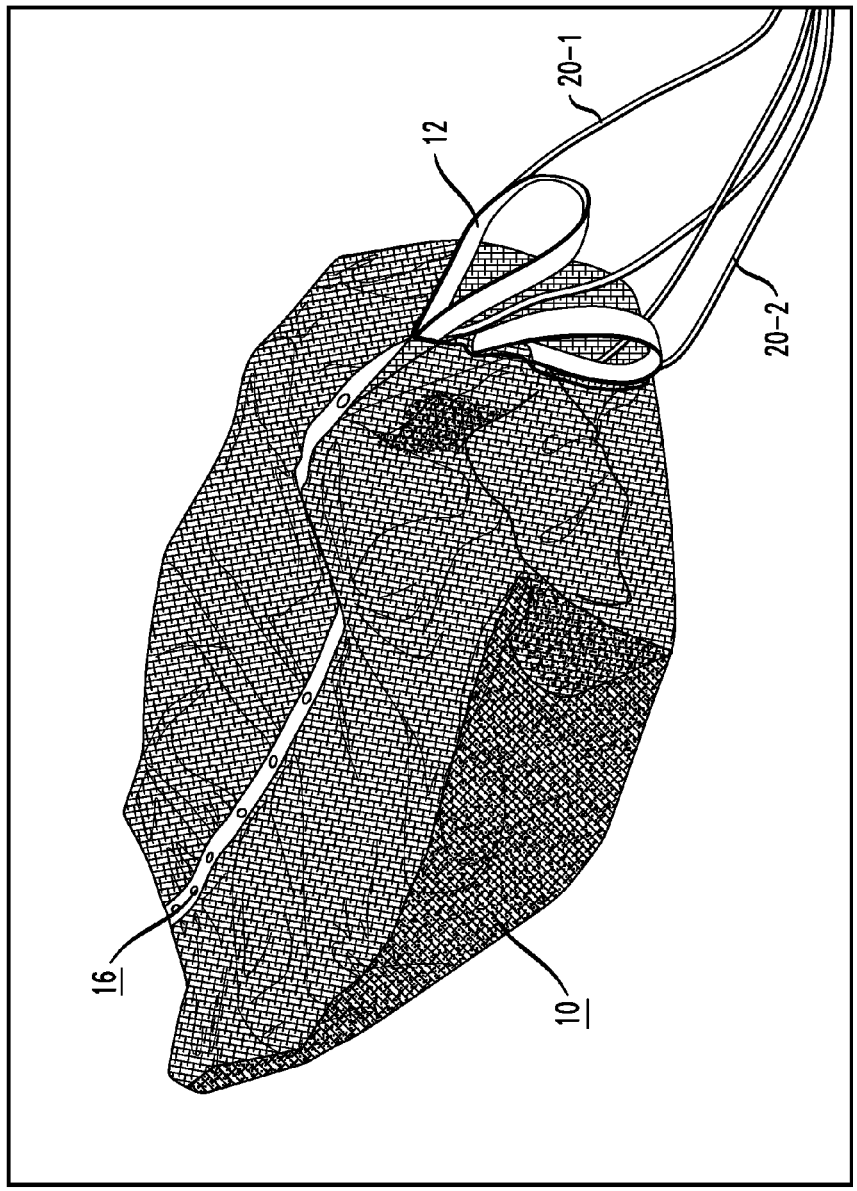
FIG. 6 is a view of the tarp of the present invention with both cinch ropes pulled and fasteners mated to form a "bag"-like enclosure.
Figure 7:
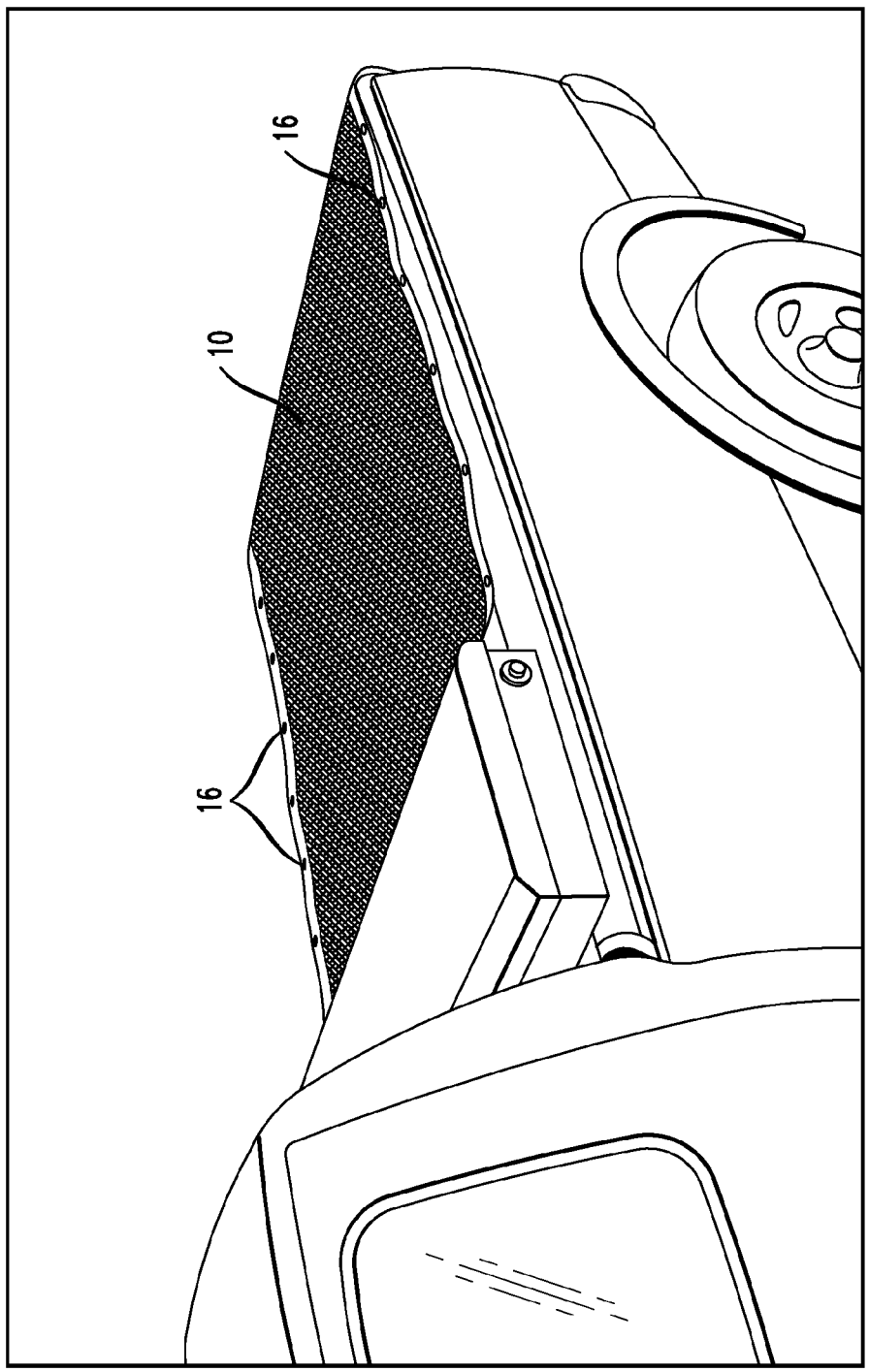
FIG. 7 illustrates an alternative use of the tarp of the present invention, in this case as a cover for a truck bed.

In use, the ropes may be pulled to gather the casing material and further enclose the landscape plants and/or material within tarp 10. FIG. 6 illustrates tarp 10 with both cinch ropes 20-1 and 20-2 pulled, fasteners snaps 16 mated to form a 'bag'-like enclosure to surround the material within tarp 10 (in situations where a larger enclosure is preferred, a pair of tarps can be joined together by their respective fastener snaps 16, and then mated to form the enclosure). Cinch ropes 20 are also useful for tying down materials when loaded in the bed of a truck. In another use, tarp 10 may be used as a cover for a truck bed, with fasteners 16 mating with like fasteners on the truck bed, holding tarp 10 in place. FIG. 7 shows this use of tarp 10.

In accordance with the present invention, the fastener and cinch rope features may be utilized to wrap one or more trees (or other landscaping items) for transportation, where the ability to 'wrap' the items has been found to drastically reduce the load time currently spent by landscapers. Indeed, the features of the inventive tarp may find uses beyond landscaping into other contracting businesses, or other uses by the general public. Moreover, while not explicitly shown in the drawings, it is to be understood that the tarp of the present invention may also include a plurality of grommets disposed around the periphery thereof, as found in prior art tarps.

While there has been shown and described what are considered to be preferred embodiments of the invention, it will of course be understood that various modifications and changes in form or detail may readily be made without departing from the spirit of the invention. It is therefore intended that the invention be not limited to the exact form and detail herein shown and described, nor to anything less than the whole of the invention as hereinafter claimed.

What is claimed is:

1. A tarpaulin formed of a sheet of generally rectangular-shaped material having a first pair of opposing edges and a second pair of opposing edges opposite to the first pair to form the generally rectangular-shaped structure, the sheet of generally rectangular-shaped material forming a set of four corners where an edge from the first pair and an edge from the second pair meet, the tarpaulin comprising a set of four handles, each of said handles located at each of of the four corners;

a pair of casings, each of said casings formed along a separate edge of the first pair of opposing edges, with a separate cinch rope disposed through each of said casings; and a plurality of fasteners formed along the second pair of opposing edges, the plurality of fasteners formed such that a first set of fasteners formed along a first edge of the second pair of opposing edges will mate with a second set of fasteners formed along a second edge side of the second pair of opposing edges, forming an enclosure tarp when mated.

2. The tarpaulin as defined in claim 1, wherein the plurality of fasteners comprise a plurality of snaps.

3. The tarpaulin as defined in claim 1, wherein the plurality of fasteners comprise a plurality of clips.

4. The tarpaulin as defined in claim 1, wherein the plurality of fasteners comprise a plurality of hook-and-loop fasteners.

5. The tarpaulin as defined in claim 1, wherein the tarpaulin further comprises a plurality of grommets disposed around a periphery thereof.

6. The tarpaulin as defined in claim 1, wherein the first pair of opposing edges is shorter than the second pair of opposing edges.

\* \* \* \* \*